April 13, 1954  R. E. BROWN ET AL  2,675,506
ELECTRICAL PROTECTIVE DEVICE
Filed April 18, 1951  2 Sheets-Sheet 1

INVENTORS
RALPH E. BROWN
BY OLIVER W. WEISS
E. m. Harrington.
ATTORNEY

April 13, 1954 R. E. BROWN ET AL 2,675,506
ELECTRICAL PROTECTIVE DEVICE
Filed April 18, 1951 2 Sheets-Sheet 2
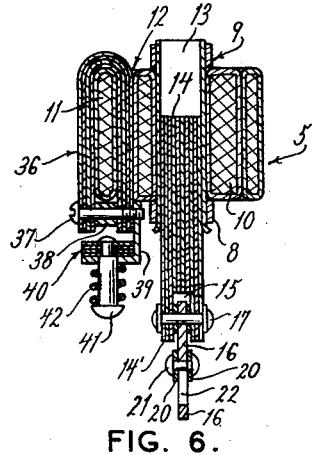
FIG. 6.
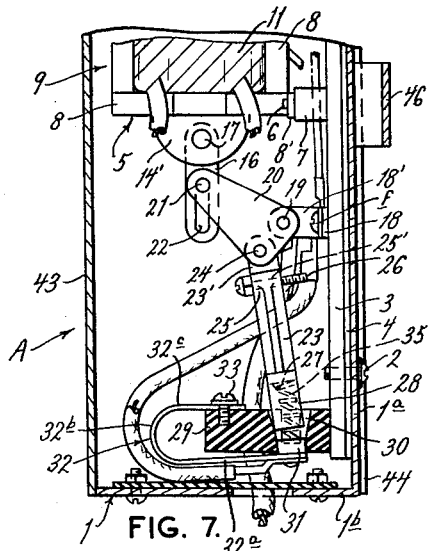
FIG. 7.
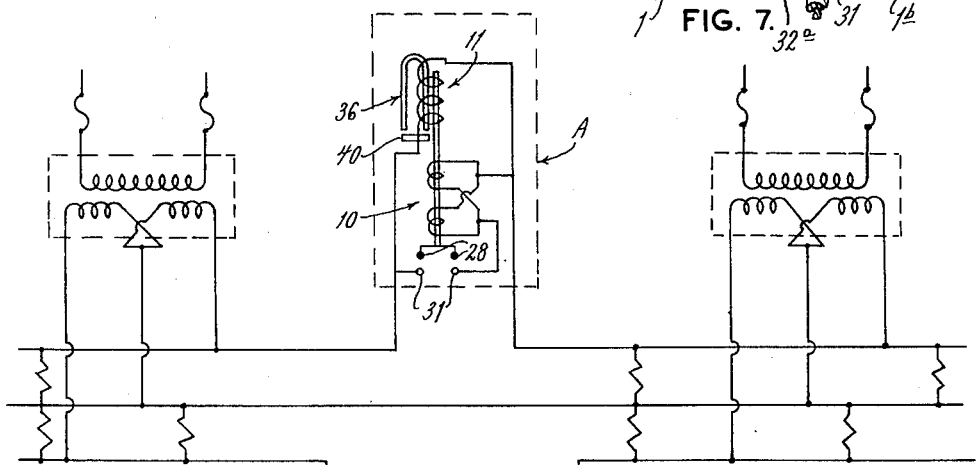
FIG. 8.
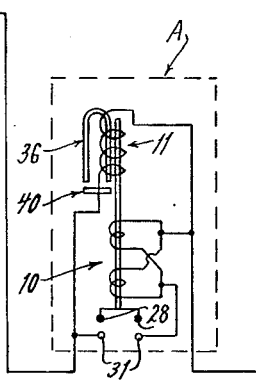
INVENTORS
RALPH E. BROWN
BY OLIVER W. WEISS
ATTORNEY Patented Apr. 13, 1954

2,675,506

UNITED STATES PATENT OFFICE 2,675,506

ELECTRICAL PROTECTIVE DEVICE

Ralph E. Brown, San Antonio, Tex., and Oliver W. Weiss, Maplewood, Mo., assignors to James R. Kearney Corporation, St. Louis, Mo., a corporation of Missouri Application April 18, 1951, Serial No. 221,708

5 Claims. (Cl. 317—23)

This invention relates generally to electrical protective devices, and more specifically to electrical protective devices adapted for use, particularly, as protective units for overhead, secondary electrical distribution networks, and which serve to eliminate the use of the secondary, sectionalizing fuses formerly employed at junction points of overhead, banked, secondary networks for protection purposes, the predominant object of the invention being to provide an improved protective device of this type which is capable of such operation that a circuit in which the protective device is interposed is automatically interrupted on the occurrence of a fault in the circuit, and is automatically re-established on elimination of such fault and the results thereof.

Prior to this invention equipment associated with overhead, banked, secondary electrical networks was protected against abnormal electrical conditions by secondary sectionalizing fuses which were located at junction points of said networks, and when, in the use of such sectionalizing fuses, a fault developed in a circuit to which one of said sectionalizing fuses was related, the fuse was ruptured and the circuit was interrupted. When such interruption of an electrical circuit occurred and a secondary sectionalizing fuse was ruptured, it was necessary to replace the ruptured fuse with an intact fuse before the interrupted circuit could be replaced in service. In the use of the device of the present invention, however, said device operates automatically to open the circuit on the occurrence of a fault, or overload, in the circuit, the device maintaining the circuit in an interrupted condition until the circuit is in a condition to be re-established, whereupon the improved device operates automatically to re-establish the circuit and thus replace it in service.

Fig. 6 is a vertical section taken on line 6—6 of Fig. 4.

Fig. 7 is a fragmentary, vertical section of the device of this invention showing parts thereof in positions different from the positions in which corresponding parts are shown in Fig. 2.

Fig. 8 is a diagrammatical wiring detail illustrating the wiring arrangement of the device of this invention with respect to the electrical circuit of the system on which it is to function.

Figure 1:
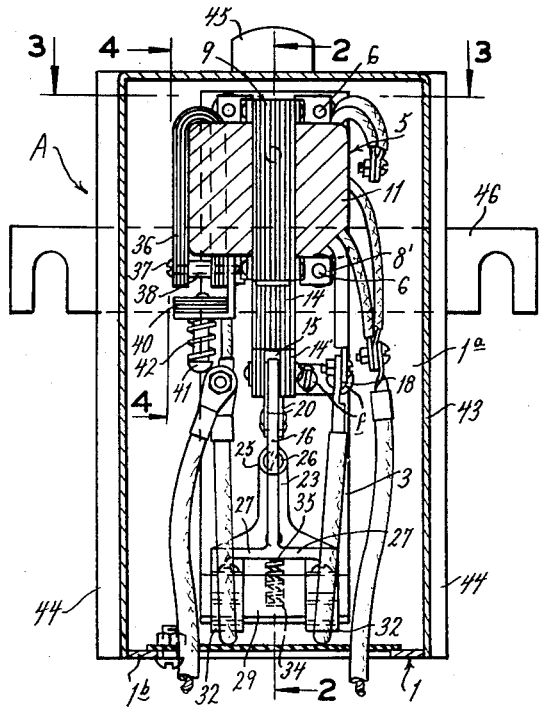
Fig. 1 is a vertical sectional view illustrating the device of the present invention.

In the drawings, wherein is shown for purposes of illustration, merely, one embodiment of the invention, A designates the improved protective device generally. The device A includes a supporting member 1 that comprises a vertically disposed rear panel 1a from the lower end of which is extended an integral bottom wall 1b, said bottom wall being of slightly less width than the rear panel 1a. Secured to the forward face of the rear panel 1a by means of fastening devices 2 is a pair of vertically extended strips of electrical insulating material, there being a relatively thick strip of material 3 and a thin strip of material 4 which is interposed between the forward face of the back panel 1a and the inner face of thick strip of material 3.

Supported by the thick strip of material 3 is a solenoid unit 5, said unit being fixed to said strip 3 by fastening devices 6 (Fig. 3) which extend through openings formed through said strip 3, and through openings formed through spacers 7, the outer shank portions of said fastening devices being screwthreaded and being screwthreadedly extended through screwthreaded openings formed through flanges 8' extended from the frame 9 of the solenoid unit 5. The frame 9 of the solenoid unit 5 is of rectangular formation, as is shown to good advantage in Fig. 2, the top, bottom, front, and rear legs of said structure being composed of laminations, and members 8 on which the flanges 8' are formed being secured by rivets, or otherwise, to the top and bottom legs of said frame.

Figure 2:
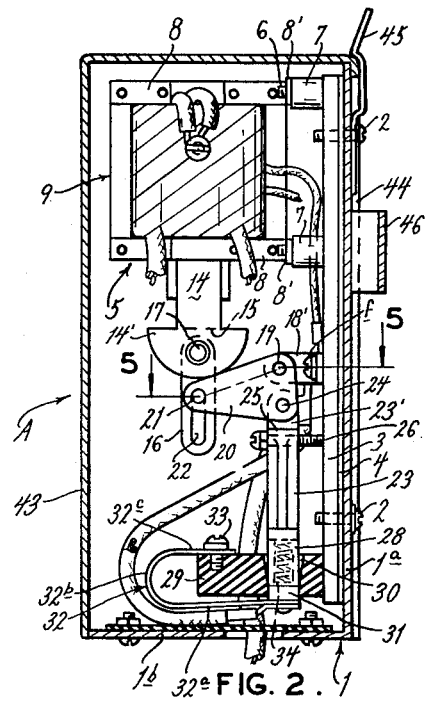
Fig. 2 is a vertical section taken on line 2—2 of Fig. 1.

The solenoid unit 5 includes a current coil 10 made up of few turns of relatively large magnet wire, and a potential coil 11 which preferably, though not necessarily, is wound over said current coil and consists of many turns of a relatively small magnet wire. The wire producing the potential coil 11 is so wound about the current coil 10 as to provide a space 12 (Fig. 3) between portions of the potential coil and portions of the current coil, this space being intended for a purpose to be hereinafter set forth. The solenoid unit 5 includes a hollow core 13 which extends axially through the current coil 10 and through an opening formed through the lower leg of the frame 9 (Fig. 6), there being an armature 14 of laminated formation arranged partially within said hollow core and adapted for movement longitudinally thereof. The armature 14 is shaped at its lower end as is shown in Figs. 2, 4, and 7; that is to say, said armature at its lower end is provided with a semi-circular portion 14'.

Figure 5:
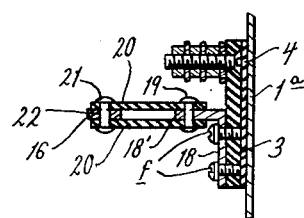
Fig. 5 is a fragmentary, horizontal section taken on line 5—5 of Fig. 2.

The semi-circular portion 14' of the armature 14 is provided with a slot 15 which receives the upper end portion of a link 16, said upper link portion being maintained within the slot 15 by a pivot element 17 that connects the link 16 to the armature 14 for pivotal movement with respect thereto. The strip of material 3 has fixed thereto an L-shaped bracket member 18 (Fig. 5), the attachment of said bracket member to said strip being accomplished through the instrumentality of a pair of fastening devices *f*. The forwardly projected portion 18' of the bracket member 18 has pivotally attached thereto by means of a pivot element 19 a pair of substantially triangular shaped elements 20, said elements 20 being formed of fiber, or other suitable electrical insulating material, and being arranged at opposite sides of said bracket portion 18', as is shown in Fig. 5. Also, the forward end portions of said elements 20 are arranged at opposite sides of the link 16 and a pin 21, which is seated at its opposite ends in openings formed in the opposed elements 20, extends through a slot 22 formed in the link 16.

Interposed between portions of the elements 20 is the upper portion 23' of a contact member 23, said contact member being pivotally secured to said elements 20 by a pivot element 24. The contact member 23 is provided with a boss 25 through which a screwthreaded opening 25' is formed, said screwthreaded opening receiving a bolt 26 that serves as an abutment which contacts with the strip of material 3 so as to limit movement of the contact member 23 in one direction. The contact member 23 at its lower end is bifurcated, as is shown to good advantage in Fig. 1, said contact member having a bridge portion 27 from which a pair of spaced, downwardly extended contacts 28 are projected. Also, fixedly secured to the strip of material 3 is a block 29 formed of electrical insulating material. The block 29 is provided with a pair of openings 30 which are of tapered shape, as is shown in Figs. 2 and 7, and at the bottom of each opening a contact 31 extends upwardly thereinto. The contacts 31 are mounted on elements 32 that are formed of resilient material, each contact 31 being mounted at an end of a lower leg 32a of its related element 32 which is partially disposed beneath the block 29 and said lower leg merging into an upwardly curved portion 32b that in turn merges into an upper leg 32c which is secured by fastening means 33 to the block 29 at the top face thereof. By referring to Fig. 1 it will be noted that the block 29 at its approximate center is provided with a cavity 34 which receives the lower end portion of a coil spring 35, the lower end of said coil spring contacting with the bottom wall of said cavity while the upper end of said coil spring contacts with the bridge portion 27 of the contact member 23.

Figure 3:
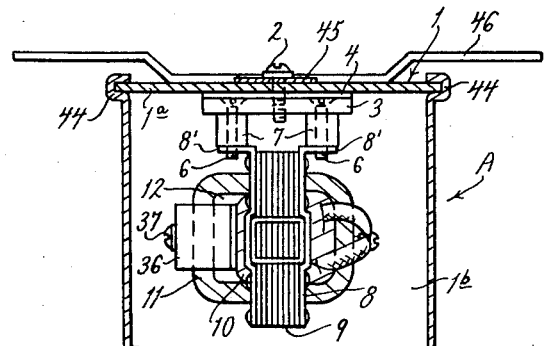
Fig. 3 is a horizontal section taken on line 3—3 of Fig. 1.
Figure 4:
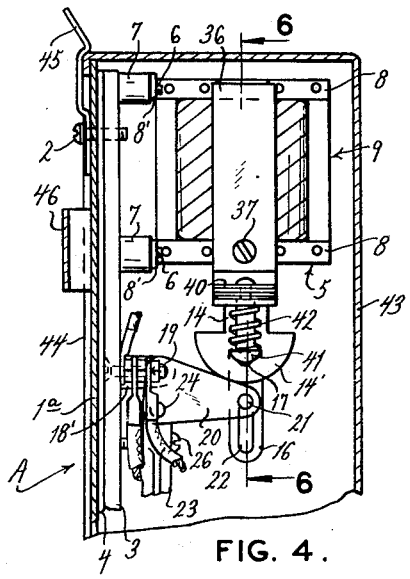
Fig. 4 is a fragmentary, vertical section of the upper portion of the device of the present invention taken on line 4—4 of Fig. 1.

The device of this invention includes a magnetic by-pass which comprises a laminated magnetic yoke 36 of inverted, U-shaped formation, the inner leg of said yoke being disposed in the space 12 between the current coil and the potential coil, previously referred to herein, and the outer leg of said yoke contacting with an outer end surface of the potential coil (see Figs. 1 and 3). The upper curved portion of the magnetic yoke contacts with a top surface portion of the potential coil 11, as is shown in Fig. 1, and the inner and outer legs of the yoke 36 are joined together by a non-magnetic bolt 37, there being a hollow, non-magnetic spacer 38 disposed between the lower portions of said inner and outer legs of the yoke through which the bolt extends, and the screwthreaded shank of said bolt being screwed into a screwthreaded opening formed in the vertical leg of an angular bracket 39. The horizontal leg of the bracket 39 supports a laminated clapper 40, said clapper having a downwardly extended headed pin 41 secured thereto by riveting, or otherwise, which pin extends through an opening formed through the horizontal leg of the bracket 39. The pin 41 is embraced by a coil spring 42 whose lower end contacts with the head of said pin and whose upper end contacts with the lower face of the bracket 39, said coil spring tending to retain the clapper in its lowered position in contact with the top face of the horizontal portion of the bracket 39.

The mechanism of the device of this invention is enclosed within a housing 43 which is provided with opposed channelways 44 in which the opposed side edge portions of the back panel 1a are received (Fig. 3). The back panel has secured thereto at the top thereof a resilient latch 45 which is shaped to overlap and thus engage a top portion of the housing 43 so as to retain the housing in proper assembled relation with the supporting member 1 has fixed thereto a member 46 that aids in mounting the device on a support.

The device of this invention is intended to isolate any portion of a banked secondary net work, or bank of distribution transformers that may be in trouble, and to accomplish this a protective device is inserted in each interconnection between adjacent transformers, except the neutral, which is common to the bank. When a fault occurs in any section of the bank the protective devices adjacent to the fault are opened by the inrush current from other sections of the bank into the faulted section through the protective devices. At the moment the protective devices are opened the clear sections of the bank regain a normal voltage level, while the faulted section will have a lower than normal voltage due to the excessive current flowing through the transformer and secondary supplying the fault. It is this potential difference across the contacts of the open protective devices that holds the protective devices adjacent to the fault open thus isolating the faulted section and allowing normal operation of the remainder of the bank. When the faulted section is returned to normal operation the potential differences referred to become insufficient to hold the protective devices open, and as a result of this situation the protective devices automatically reclose and the complete bank is restored to normal operation.

In the operation of one of the protective devices the solenoid armature starts to pull in, as the current increases, or is suddenly applied, in the current coil. Because of the slot 22 in the link 16 the armature 14 travels the greater part of its total stroke before it picks up the pin 21 of the elements 20, and when said pin is picked up by the lower end of said slot 22 the elements 20 are rotated in their pivot 19 so as to move the pivot 24 outwardly and upwardly. The elements 20 and the contact member 23 are normally disposed in an over-center toggle arrangement, and when the pivot 24 is moved outwardly and upwardly, as described, the toggle is broken and the contact member is quickly moved upwardly by the coil spring 35.

A short time after tripping, the potential difference between the contacts should increase to full line voltage due to the clear portion of the bank regaining normalcy and the faulted portion of the bank ceasing to operate due to the transformer fuses functioning. With full line voltage impressed on the potential coil, the armature and the field magnetic circuit become saturated resulting in a high magnetizing current. This current causes the clapper 40 to be pulled into contact with the magnetic by-pass yoke 36 which materially increases the impedance of the potential coil, thus reducing the magnetizing current to a safe value at full line voltage. When that portion of the bank which is out of service is restored to normal operation, there will be substantially no potential difference across the contacts of the protective device, thus de-energizing the potential coil, and because there is no restraining force on the armature, the contacts of the protective device fall to the closed position of said contacts.

We claim:

1. An electrical protective device comprising a first coil adapted to be connected into a circuit protected by the device for normal passage through said first coil of current passing through the protected circuit, a second coil disposed adjacent to said first coil, a magnetizable armature common to and movable with respect to both of said coils, contacts connected to said armature and operable to open position in response to movement of said armature to interrupt abnormal passage of current through the protected circuit and to cause electrical energy of normal resistance to flow through said second coil so as to cause said armature to be held in the open-contact position, means for connecting said second coil in parallel with the series combination of the contacts and the first coil, and magnetic by-pass means operable to materially increase the impedance of said second coil thus reducing the magnetizing current to a safe value at full line voltage, said magnetic by-pass means including a magnetic member related to said second coil, and a clapper adapted for movement into and out of contact with said magnetic member.

2. An electrical protective device comprising a first coil adapted to be connected into a circuit protected by the device for normal passage through said first coil of current passing through the protected circuit, a second coil disposed adjacent to said first coil, a magnetizable armature common to and movable with respect to both of said coils, contacts connected to said armature and operable to open position in response to movement of said armature to interrupt abnormal passage of current through the protected circuit and to cause electrical energy of normal resistance to flow through said second coil so as to cause said armature to be held in the open-contact position, means for connecting said second coil in parallel with the series combination of the contacts and the first coil, and magnetic by-pass means operable to materially increase the impedance of said second coil thus reducing the magnetizing current to a safe value at full line voltage, said magnetic by-pass means including a magnetic yoke arranged in partial embracing relation with respect to a portion of said second coil, and a clapper adapted for movement into and out of contact with said magnetic yoke.

3. An electrical protective device comprising a first coil adapted to be connected into a circuit protected by the device for normal passage through said first coil of current passing through the protected circuit, a second coil disposed adjacent to said first coil, a magnetizable armature common to and movable with respect to both of said coils, contacts connected to said armature and operable to open position in response to movement of said armature to interrupt abnormal passage of current through the protected circuit and to cause electrical energy of normal resistance to flow through said second coil so as to cause said armature to be held in the open-contact position, means for connecting said second coil in parallel with the series combination of the contacts and the first coil, and magnetic by-pass means operable to materially increase the impedance of said second coil thus reducing the magnetizing current to a safe value at full line voltage, said magnetic by-pass means including a magnetic yoke arranged in partial embracing relation with respect to said second coil, a clapper adapted for movement into and out of contact with said magnetic yoke, and means for urging said clapper to a position where it is out of contact with said magnetic yoke.

4. An electrical protective device comprising a first coil adapted to be connected into a circuit protected by the device for normal passage through said first coil of current passing through the protected circuit, a second coil disposed adjacent to said first coil, a magnetizable armature common to and movable with respect to both of said coils, contacts connected to said armature and operable to open position in response to movement of said armature to interrupt abnormal passage of current through the protected circuit and to cause electrical energy of normal resistance to flow through said second coil so as to cause said armature to be held in the open-contact position, means for connecting said second coil in parallel with the series combination of the contacts and the first coil, and magnetic by-pass means operable to materially increase the impedance of said second coil thus reducing the magnetizing current to a safe value at full line voltage, said magnetic by-pass means including a magnetic yoke arranged in partial embracing relation with respect to said second coil, a clapper adapted for movement into and out of contact with said magnetic yoke, and spring means for urging said clapper to a position where it is out of contact with said magnetic yoke.

5. An electrical protective device comprising a first coil adapted to be connected into a circuit protected by the device for normal passage through said first coil of current passing through the protected circuit, a second coil disposed adjacent to said first coil, a magnetizable armature common to and movable with respect to both of said coils, contacts connected to said armature and operable to open position in response to movement of said armature to interrupt abnormal passage of current through the protected circuit and to cause electrical energy of normal resistance to flow through said second coil so as to cause said armature to be held in the open-contact position, means for connecting said second coil in parallel with the series combination of the contacts and the first coil, and magnetic by-pass means operable to materially increase the impedance of said second coil thus reducing the magnetizing current to a safe value at full line voltage, said magnetic by-pass means including a magnetic yoke arranged in partial embracing relation with respect to said second coil, a clapper adapted for movement into and out of contact with said magnetic yoke, and means comprising a coil spring for urging said clapper to a position where it is out of contact with said magnetic yoke.

References Cited in the file of this patent

UNITED STATES PATENTS

| Number | Name | Date |
|---|---|---|
| 656,324 | Holmes | Aug. 21, 1900 |
| 941,660 | Smith | Nov. 30, 1909 |
| 1,005,575 | Raney et al. | Oct. 10, 1911 |
| 1,007,480 | North et al. | Oct. 31, 1911 |
| 1,438,727 | Schwagermann | Dec. 12, 1922 |
| 1,491,346 | Gent | Apr. 22, 1924 |
| 1,671,068 | Deutsch | May 22, 1928 |
| 1,689,421 | Burnham | Oct. 30, 1928 |
| 1,714,085 | Getchell | May 21, 1929 |
| 2,097,014 | Bates | Oct. 26, 1937 |
| 2,135,490 | Blodgett | Nov. 8, 1938 |
| 2,514,012 | Rypenski | July 4, 1950 |
| 2,528,194 | Van Ryan | Oct. 31, 1950 |
| 2,537,618 | Bourne | Jan. 9, 1951 |